United States Patent
Hoelzl et al.

(10) Patent No.: US 11,486,446 B2
(45) Date of Patent: Nov. 1, 2022

(54) PLAIN BEARING ARRANGEMENT

(71) Applicant: Miba Gleitlager Austria GmbH, Laakirchen (AT)

(72) Inventors: Johannes Hoelzl, Berg im Attergau (AT); Klaus Herbst, Ebensee (AT); Marek Ciklamini, Gmunden (AT); Albert Waldl, Laakirchen (AT); Martin Holzinger, Scharnstein (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 0 days.

(21) Appl. No.: 17/434,889

(22) PCT Filed: Mar. 4, 2020

(86) PCT No.: PCT/AT2020/060063
§ 371 (c)(1),
(2) Date: Aug. 30, 2021

(87) PCT Pub. No.: WO2020/176918
PCT Pub. Date: Sep. 10, 2020

(65) Prior Publication Data
US 2022/0056948 A1 Feb. 24, 2022

(30) Foreign Application Priority Data
Mar. 7, 2019 (AT) .............. A 50182/2019

(51) Int. Cl.
*F16C 17/02* (2006.01)
*F16C 43/02* (2006.01)
(Continued)

(52) U.S. Cl.
CPC .............. *F16C 43/02* (2013.01); *F03D 80/70* (2016.05); *F16C 17/02* (2013.01); *F16C 17/035* (2013.01);
(Continued)

(58) Field of Classification Search
CPC ........ F16C 17/02; F16C 17/03; F16C 17/035; F16C 17/10; F16C 17/26; F16C 33/26;
(Continued)

(56) References Cited

U.S. PATENT DOCUMENTS 2,276,143 A   3/1942 Bell
2,898,164 A   8/1959 Patton
(Continued)

FOREIGN PATENT DOCUMENTS

AT   509 625 A1   10/2011
AT   519 288 B1   7/2018
(Continued)

OTHER PUBLICATIONS

International Search Report in PCT/AT2020/060063, dated Jun. 18, 2020.
(Continued)

*Primary Examiner* — Alan B Waits
(74) *Attorney, Agent, or Firm* — Collard & Roe, P.C.

(57) ABSTRACT

A sliding bearing includes:—an inner ring element;—an outer ring element;—at least one sliding bearing element, which is arranged between the inner ring element and the outer ring element. The sliding bearing element has multiple sliding bearing pads, wherein the individual sliding bearing pads each have a radial bearing surface and a fastening profile located opposite the radial bearing surface. The inner ring element has at least one receiving profile on its radial outside, which receiving profile serves for the positive locking connection between the sliding bearing pads and the inner ring element.

15 Claims, 7 Drawing Sheets

(51) Int. Cl.
*F03D 80/70* (2016.01)
*F16C 33/26* (2006.01)
*F16C 17/03* (2006.01)

(52) U.S. Cl.
CPC ............ *F16C 33/26* (2013.01); *F16C 17/028* (2013.01); *F16C 2226/76* (2013.01); *F16C 2300/14* (2013.01); *F16C 2360/31* (2013.01)

(58) Field of Classification Search
CPC .............. F16C 2360/31; F16C 2226/70; F16C 2226/76; F16C 2300/14; F03D 80/70
See application file for complete search history.

(56) References Cited

U.S. PATENT DOCUMENTS

| | | | |
|---|---|---|---|
| 5,125,754 A * | 6/1992 | Ide | F16C 25/02 384/122 |
| 9,353,788 B1 * | 5/2016 | Tulett | F16C 33/043 |
| 9,458,880 B2 | 10/2016 | Kari et al. | |
| 10,072,704 B2 | 9/2018 | Sato et al. | |
| 10,260,484 B2 | 4/2019 | Eriksen et al. | |
| 10,598,214 B2 | 3/2020 | Hoelzl | |
| 2002/0051586 A1 * | 5/2002 | Orndorff, Jr. | F16C 33/22 384/98 |
| 2014/0169952 A1 * | 6/2014 | Pedersen | F16C 17/06 415/170.1 |
| 2014/0377063 A1 | 12/2014 | Guerenbourg et al. | |
| 2017/0260970 A1 * | 9/2017 | Stiesdal | F03D 80/70 |

FOREIGN PATENT DOCUMENTS

| | | |
|---|---|---|
| DE | 26807 C | 8/1883 |
| DE | 531749 C | 8/1931 |
| DE | 650737 C | 9/1937 |
| DE | 678930 C | 7/1939 |
| DE | 826807 C | 1/1952 |
| DE | 1625538 A1 | 3/1972 |
| EP | 2 816 226 A1 | 12/2014 |
| EP | 2 863 076 A1 | 4/2015 |
| EP | 3 219 984 A1 | 9/2017 |
| EP | 3 276 192 A1 | 1/2018 |
| FR | 1464065 A | 7/1966 |
| JP | H09303382 A * | 11/1997 |
| WO | 2011/127510 A1 | 10/2011 |
| WO | 2017/034787 A1 | 3/2017 |

OTHER PUBLICATIONS

International Search Report in PCT/AT2020/060064, dated Jul. 14, 2020.

* cited by examiner

PLAIN BEARING ARRANGEMENT

CROSS REFERENCE TO RELATED APPLICATIONS

This application is the National Stage of PCT/AT2020/060063 filed on Mar. 4, 2020, which claims priority under 35 U.S.C. § 119 of Austrian Application No. A50182/2019 filed on Mar. 7, 2019, the disclosure of which is incorporated by reference. The international application under PCT article 21(2) was not published in English.

The invention relates to a sliding bearing as well as a nacelle for a wind turbine equipped with the sliding bearing as well as a method for changing sliding bearing pads in the sliding bearing. Furthermore, the invention relates to a method for producing an inner ring element for a sliding bearing.

A bearing element for bearing the rotor hub of a wind turbine is known from WO 2011/127510 A1.

The object of the present invention was to provide an improved sliding bearing.

This object is achieved by means of a device and a method according to the claims.

According to the invention, a sliding bearing is provided. The sliding bearing comprises:
- an inner ring element;
- an outer ring element;
- at least one sliding bearing element, which is arranged between the inner ring element and the outer ring element.

The sliding bearing element has multiple sliding bearing pads, wherein the individual sliding bearing pads each have a radial bearing surface and a fastening profile located opposite the radial bearing surface. The inner ring element has at least one receiving profile on its radial outside, which receiving profile serves for the positive locking connection between the sliding bearing pads and the inner ring element.

The sliding bearing has the advantage that the individual sliding bearing pads can be easily connected to the inner ring element, and thus a simple installation and/or a simple replacement of the individual sliding bearing pads can be achieved.

Furthermore, it may be useful if the fastening profile of the sliding bearing pad and the receiving profile of the inner ring element are formed such that the sliding bearing pad can be inserted into the inner ring element in the axial direction. By these measures, a simple replaceability of the sliding bearing pads can be achieved, and at the same time, a tight fit of the sliding bearing pads can be achieved in the operational condition of the sliding bearing.

Moreover, it may be provided that the fastening profile and the receiving profile are formed as a dovetail connection. By these measures, a simple replaceability of the sliding bearing pads can be achieved, and at the same time, a tight fit of the sliding bearing pads can be achieved in the operational condition of the sliding bearing.

Moreover, it may be provided that an axial stop for the sliding bearing pad is formed on the inner ring element in the region of the receiving profile. This measure allows additionally achieving an axial positioning of the sliding bearing pad.

An embodiment, according to which it may be provided that a releasable axial clamping element for the sliding bearing pad is formed on the inner ring element in the region of the receiving profile, wherein a first end face of the sliding bearing pad can be placed on the axial stop in the axial direction, and the axial clamping element can be acted upon a second end face of the sliding bearing pad, is also advantageous. By this measure, the sliding bearing pad can be fixed in the axial direction.

According to an advancement, it is possible that a clamping device is arranged between the fastening profile of the sliding bearing pad and the receiving profile of the inner ring element, by means of which clamping device the sliding bearing pad can be clamped. By these measures, the sliding bearing pad can be fastened sufficiently fixedly on the inner ring element, so that no vibrations of the sliding bearing pad occur, or no displacement of the sliding bearing pad occurs.

Furthermore, it may be useful if the clamping device comprises at least a first clamping wedge, which has a wedge surface, which cooperates with a first counter wedge surface formed in the receiving profile and tapering in the axial direction, wherein the first clamping wedge can be displaced in the axial direction by means of a first positioning means, in particular a thread element. A clamping wedge formed like this, in particular, is surprisingly suitable for establishing a connection, which can transfer high forces, and which is easily releasable.

Moreover, it may be provided that the clamping device comprises a second clamping wedge, which has a wedge surface, which cooperates with a second counter wedge surface formed in the receiving profile and tapering in the axial direction, wherein the first counter wedge surface and the second counter wedge surface are formed to taper in opposite directions, wherein the second clamping wedge can be displaced in the axial direction by means of a second positioning means, in particular a thread element. This measure allows achieving a symmetrical clamping of the sliding bearing pad.

Furthermore, further be provided that the first positioning means, and the second positioning means are formed on a common positioning rod, wherein the first positioning means has a right-handed thread and the second positioning means has a left-handed thread. This entails the advantage that by rotating the common positioning rod, both clamping wedges can be opened and/or closed. For this function, it is essential that on the first positioning means and on the second positioning means, an opposing thread is formed. However, for everyday use, it is useful in the described configuration that the first positioning means is a right-handed thread, so that by a clockwise rotation, the clamping can be closed, and by a counterclockwise rotation, the clamping can be opened.

According to a particular embodiment, it is possible that at least a first axial bearing surface is formed on the sliding bearing pad, which first axial bearing surface is arranged at a first angle of 90° relative to the radial bearing surface when viewed in a longitudinal section, in particular that also a second axial bearing surface is formed on the sliding bearing pad, which second axial bearing surface is arranged at a second angle of 90° relative to the radial bearing surface, and which is arranged opposite the first axial bearing surface. By this measure, not only a radial bearing but additionally, an axial bearing of the inner ring element on the outer ring element can be achieved by means of the sliding bearing pads.

According to an advantageous advancement, it may be provided that the inner ring element has multiple tilting segments, which are arranged so as to be distributed across the circumference, wherein the individual tilting segments are arranged so as to be spaced apart from one another in the circumferential direction and can be tilted independently of one another, wherein at least one of the receiving profiles is formed for each tilting segment. This entails the advantage that possible production tolerances and/or also possible deformations of the shaft can be compensated by the tilting segments, so that it can be achieved that the radial bearing surface rests on the counterface over its entire surface at any time, and thus, no excessively high area loads occur.

In particular, it may be advantageous if the individual tilting segments have a first recess at least on a first front side observed in the axial direction, in particular that the individual tilting segments have a second recess on a second front side observed in the axial direction, in particular that the individual tilting segments are designed to have a Z-shaped cross-section. Because of such a structure, a good functionality of the individual tilting segments can be achieved. In particular, the tiltability of the individual tilting segments can be facilitated by such a structure.

Furthermore, it may be provided that the outer ring element is designed to be sleeve-shaped, wherein a first end wall protruding radially inwards is formed on a first front side, and that a first axial bearing surface of the sliding bearing pad abuts on the first end wall. By this measure, a simple installation and/or a simple replacement of the individual sliding bearing pads can be achieved.

Moreover, it may be provided that the first end wall, and thus also the first axial bearing surface, is arranged at an angle of 90° relative to the central axis.

In addition to this, it may be provided that the radial bearing surface has a conical shape.

In particular, it may be provided that the first axial bearing surface and the radial bearing surface, observed in the cross-section, are arranged in a V-shape relative to one another. The radial bearing surface can therefore also serve for absorbing axial bearing forces.

Moreover, it may be provided, that the radial bearing surface has a conical shape and that in a mirrored design, a second inner ring element, also with sliding bearing pads arranged thereon, is formed. In such an embodiment variant, the radial bearing surfaces of the two sliding bearing pads arranged in a mirrored manner may be arranged in a V-shape relative to one another. By means of such an embodiment variant, both radial bearing forces and axial bearing forces can be absorbed by the sliding bearing.

Furthermore, it may be provided that the outer ring element is designed to be sleeve-shaped, wherein a first end wall protruding radially inwards is formed on a first front side, and a second end wall protruding radially inwards is formed on a second front side, wherein in at least one of the end walls of the outer ring element, an opening is formed, which serves for changing the sliding bearing pad, and which is closed by means of a lid, wherein the lid is releasably fastened to the outer ring element by means of fastening means. By this measure, a simple installation and/or a simple replacement of the individual sliding bearing pads can be achieved.

Moreover, it may be provided that the outer ring element is formed in one piece, in particular that the counterface is formed as an interruption-free surface.

Moreover, it may be provided that the first end wall inner surface and the second end wall inner surface of the outer ring element are arranged at an axial distance from one another, and that the first axial bearing surface and the second axial bearing surface of the sliding bearing pad are arranged at an axial distance from one another, wherein the axial distance between the two end wall inner surfaces is greater than the axial distance between the two axial bearing surfaces.

According to the invention, a nacelle for a wind turbine is provided. The nacelle comprises:

a nacelle housing;
a rotor hub;
a rotor bearing for bearing the rotor hub on the nacelle housing.

The rotor bearing comprises a sliding bearing according to one of the preceding claims.

In nacelles according to the invention, in particular, the sliding bearing according to the invention leads to an easy maintainability of the sliding bearing.

Moreover, a wind turbine with a nacelle as described above is provided according to the invention.

According to the invention, a method for replacing sliding bearing pads in a sliding bearing as described above is provided. The method comprises the following method steps:

removing one of the sliding bearing pads by pulling the fastening profile of the relevant sliding bearing pad axially out of the receiving profile of the inner ring element;

inserting the new sliding bearing pad by pushing the fastening profile of the relevant sliding bearing pad axially into the receiving profile of the inner ring element.

According to the invention, a method for producing an inner ring element for a sliding bearing is provided. The method comprises the method steps:

pre-forging an inner ring blank for a rough shaping of a blank contour;

normalizing the inner ring blank;

producing the receiving profile by processing the inner ring blank by means of machining.

The inner ring blank may be made of a quenched and tempered steel pursuant to DIN EN 10083. In particular, 42CrMo4 may be used as the material for the inner ring blank.

For the purpose of better understanding of the invention, it will be elucidated in more detail by means of the figures below.

These show in a respectively very simplified schematic representation.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
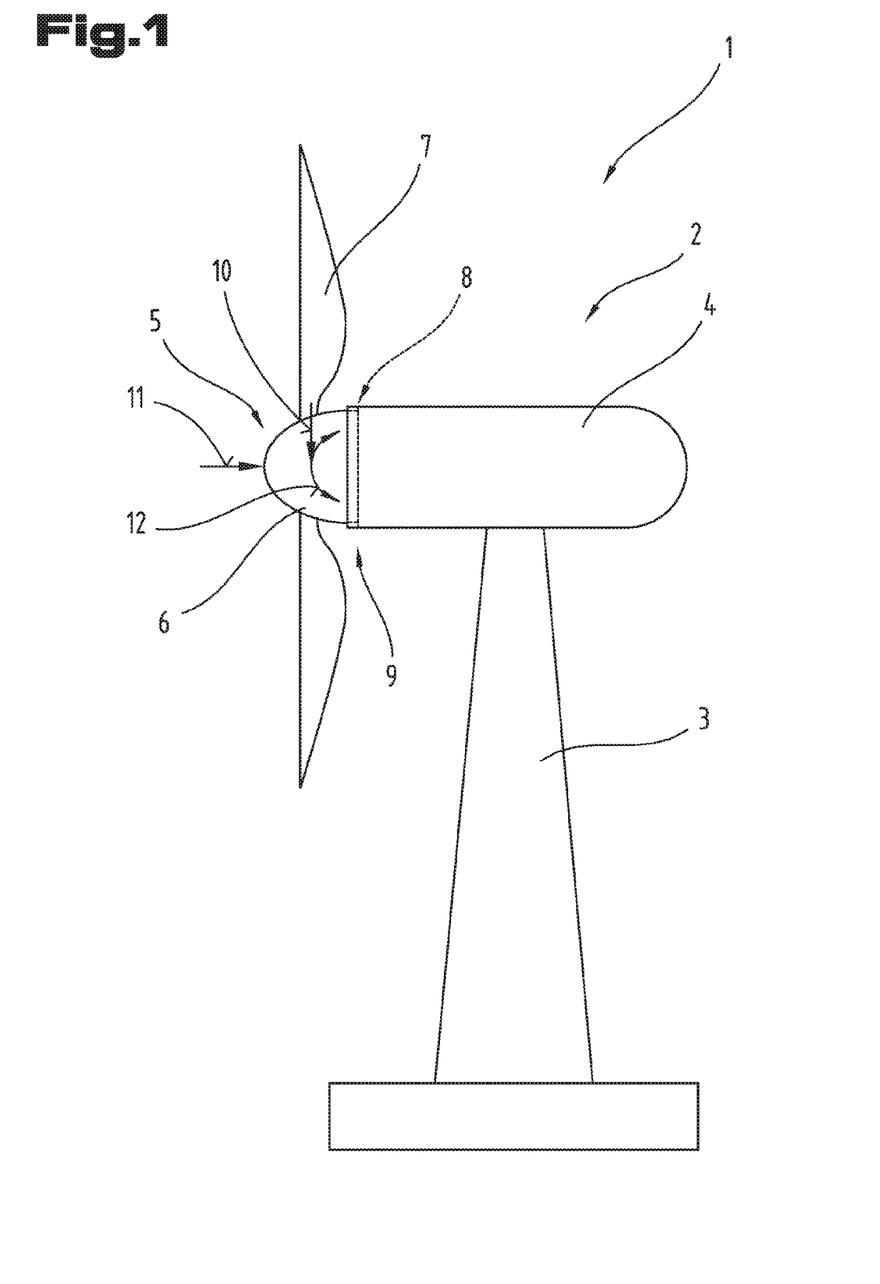
FIG. 1 a schematic representation of a wind turbine.

FIG. 1 shows, in a schematic view, a first exemplary embodiment of a wind turbine 1 for generating electrical energy from wind energy. The wind turbine 1 comprises a nacelle 2, which is rotatably received on a tower 3. The nacelle 2 comprises a nacelle housing 4, which forms the main structure of the nacelle 2. In the nacelle housing 4 of the nacelle 2, the electrotechnical components such as a generator of the wind turbine 1 are arranged.

Moreover, a rotor 5 is formed, which has a rotor hub 6 with rotor blades 7 arranged thereon. The rotor hub 6 is considered part of the nacelle 2. The rotor hub 6 is received so as to be rotatable on the nacelle housing 4 by means of a rotor bearing 8. In particular, it is provided that a sliding bearing 9 according to the invention and described in more detail below is used as a rotor bearing 8.

The rotor bearing 8, which serves for bearing the rotor hub 6 on the nacelle housing 4 of the nacelle 2, is configured for absorbing a radial force 10, an axial force 11 and a tilting torque 12. The axial force 11 is caused by the force of the wind. The radial force 10 is caused by the weight force of the rotor 5 and is effective at the center of gravity of the rotor 5. As the center of gravity of the rotor 5 is outside the rotor bearing 8, the tilting torque 12 is generated in the rotor bearing 8 by the radial force 10. The tilting torque 12 may also be caused by an uneven load of the rotor blades 7.

The rotor bearing 8 according to the invention can have a diameter of 0.5 m to 5 m, for example. Of course, it is also conceivable that the rotor bearing 8 is smaller or larger.

Figure 2:
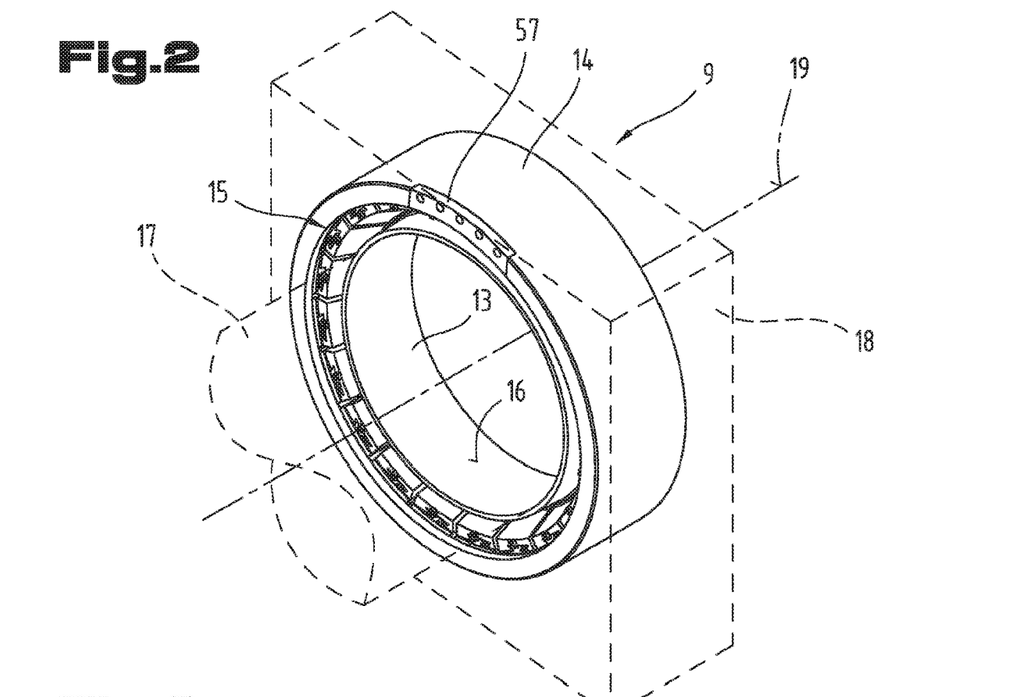
FIG. 2 a perspective view of an exemplary embodiment of a sliding bearing.

FIG. 2 shows a first exemplary embodiment of the sliding bearing 9 built into the nacelle 2. The sliding bearing 9 is shown in a perspective view in FIG. 2. Of course, the sliding bearing 9 shown in FIG. 2 may also be used in all other industrial applications outside of wind turbines. As can be seen in FIG. 2, it may be provided that the sliding bearing 9 has an inner ring element 13 and an outer ring element 14. Between the inner ring element 13 and the outer ring element 14, a sliding bearing element 15 is arranged, which serves for the rotatory sliding bearing of the inner ring element 13 relative to the outer ring element 14.

In the exemplary embodiment shown in FIG. 2, an inner jacket surface 16 is formed on the inner ring element 13, which inner jacket surface 16 has a cylindrical shape and serves for receiving a rotor shaft 17 or any other shaft. The rotor shaft 17 is schematically shown in FIG. 2. Moreover, it may be provided that the outer ring element 14 is coupled to the nacelle housing 4 by means of a bearing mount 18. In the exemplary embodiment shown in FIG. 2, it is therefore provided that the outer ring element 14 is rigidly coupled to the nacelle housing 4, and the inner ring element 13 is rotatable with respect to a rotor axis 19 relative to the outer ring element 14 by means of the sliding bearing element 15. As the rotor shaft 17, which is coupled to the rotor hub 6 and thus to the rotor 5, is received in the inner ring element 13, the rotor shaft 17 is therefore rotatably received in the nacelle housing 4 by means of the sliding bearing 9.

Figure 3:
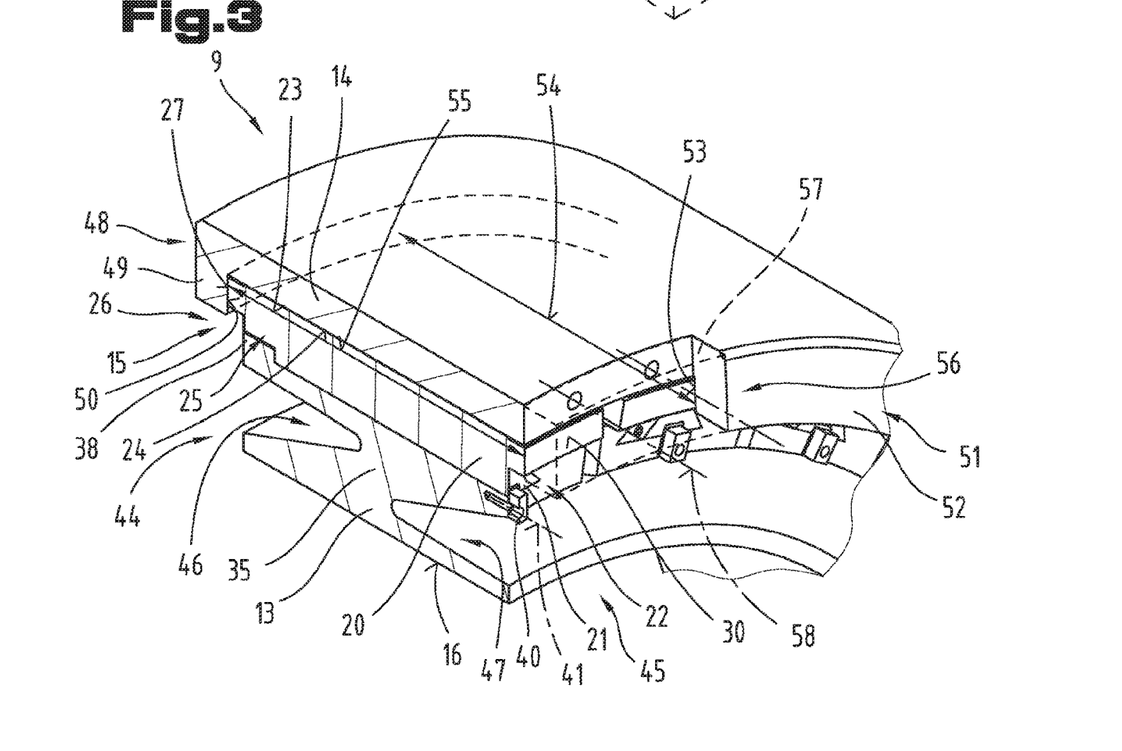
FIG. 3 a perspective sectional representation of the sliding bearing.

In FIG. 3, the sliding bearing 9 is shown in a perspective cross-sectional view. As can be seen in FIG. 3, the sliding bearing element 15 comprises multiple individual sliding bearing pads 20, which are arranged distributed across the circumference, between the inner ring element 13 and the outer ring element 14. The individual sliding bearing pads 20 have a fastening profile 21, which cooperates with a receiving profile 22 arranged in the inner ring element 13. Hence, the sliding bearing pads 20 are releasably received on the inner ring element 13 by means of the fastening profile 21 and/or the receiving profile 22.

Figure 4:
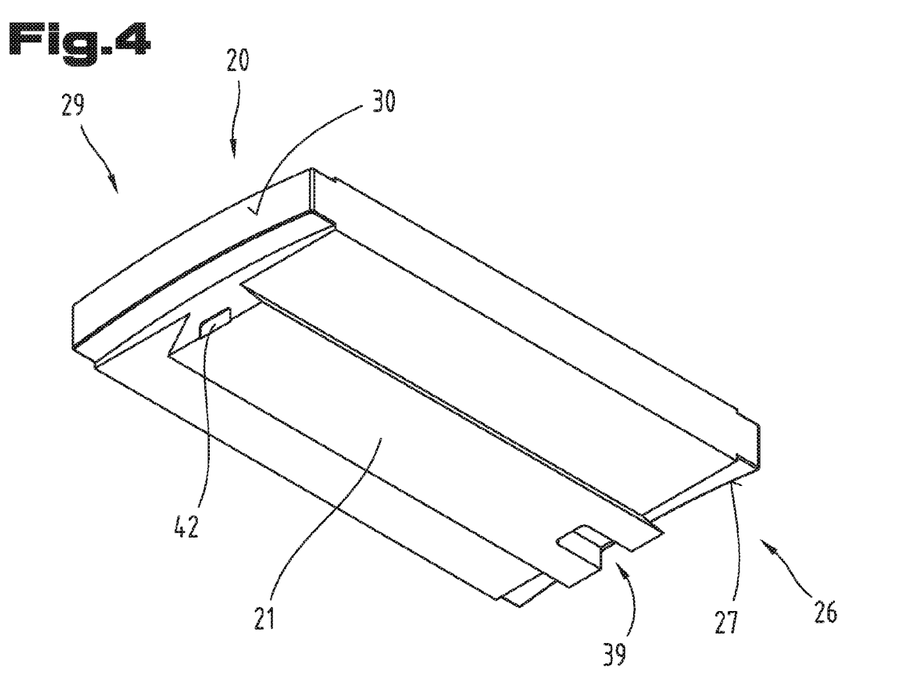
FIG. 4 a first perspective view of an exemplary embodiment of a sliding bearing pad.
Figure 5:
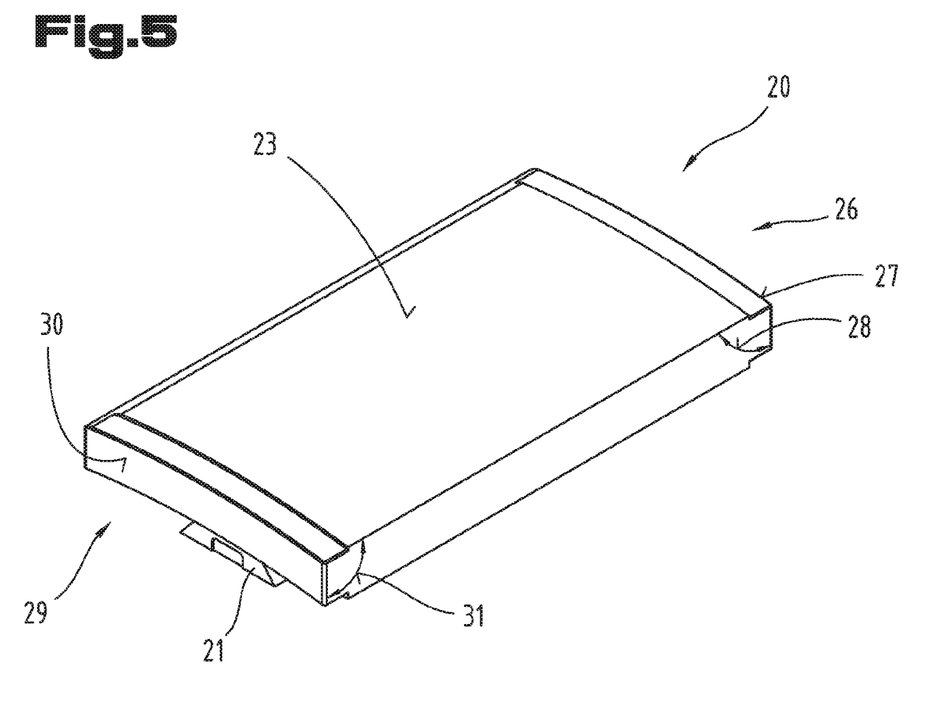
FIG. 5 a second perspective view of the exemplary embodiment of the sliding bearing pad.

The individual sliding bearing pads 20 are in each case shown in a perspective view in FIGS. 4 and 5. The further structure of the sliding bearing 9, in particular of the sliding bearing pads 20, is carried out with a combination of FIGS. 3, 4 and 5.

As can be seen in FIGS. 3, 4 and 5, it may be provided that the fastening profile 21 and/or the receiving profile 22 is designed as a dovetail connection. Thus, the individual sliding bearing pads 20 can be inserted, in the axial direction of the rotor axis 19 into the receiving profile 22 of the inner ring element 13 and/or be removed therefrom. This serves to simply replace and/or to simply install the individual sliding bearing pads 20. Moreover, the dovetail connection allows achieving that the individual sliding bearing pads 20 are connected well to the inner ring element 13 due to the positive locking dovetail connection.

In the operating state of the sliding bearing 9, the individual sliding bearing pads 20 are thus fixedly connected to the inner ring element 13 due to the structure described and thus, rotate along with it relative to the outer ring element 14. In order to enable the rotational movement between the inner ring element 13 and the outer ring element 14, on each of the individual sliding bearing pads 20 one radial bearing surface 23 is formed opposite the fastening profile 21, which radial bearing surface 23 abuts on a counterface 24 of the outer ring element 14 in the operational state of the sliding bearing 9. The counterface 24 is arranged on the inside 25 of the outer ring element 14. The radial bearing surface 23 of the sliding bearing pad 20 and the counterface 24 of the outer ring element 14 are designed as sliding surfaces, which slide on one another during operation of the sliding bearing 9. In particular, it may be provided that the counterface 24 of the outer ring element 14 is designed as a hard, wear-resistant surface, which may be formed, for example, by a hardened steel. The radial bearing surface 23 of the sliding bearing pad 20 may be formed of a sliding bearing material which is soft in comparison to the counterface 24. Of course, it is also conceivable that the radial bearing surface 23 has an anti-friction coating.

As can be seen in FIGS. 4 and 5, a first axial bearing surface 27 is formed on the sliding bearing pad 20 on a first end face 26, which axial bearing surface 27 serves for axial bearing of the inner ring element 13 on the outer ring element 14. In particular, it may be provided that the first axial bearing surface 27 is arranged at a first angle 28 relative to the radial bearing surface 23. As the radial bearing surface 23 is a cylinder section, the first angle 28 can be best determined in a longitudinal section through the sliding bearing pad 20. The first angle 28 is preferably 90°. In other words, the first axial bearing surface 27 is arranged at a right angle relative to the radial bearing surface 23.

Analogously to this, a second axial bearing surface 30 is formed on the second end face 29 of the sliding bearing pad 20, which axial bearing surface 30 is arranged at a second angle 31 relative to the radial bearing surface 23. The second angle 31 may also be 90°. In particular, it may be provided that the first axial bearing surface 27 and the second axial bearing surface 30 are formed on the sliding bearing pad 20 so as to be located opposite one another. The first axial bearing surface 27 and the second axial bearing surface 30 can thus be arranged in parallel with one another.

Figure 6:
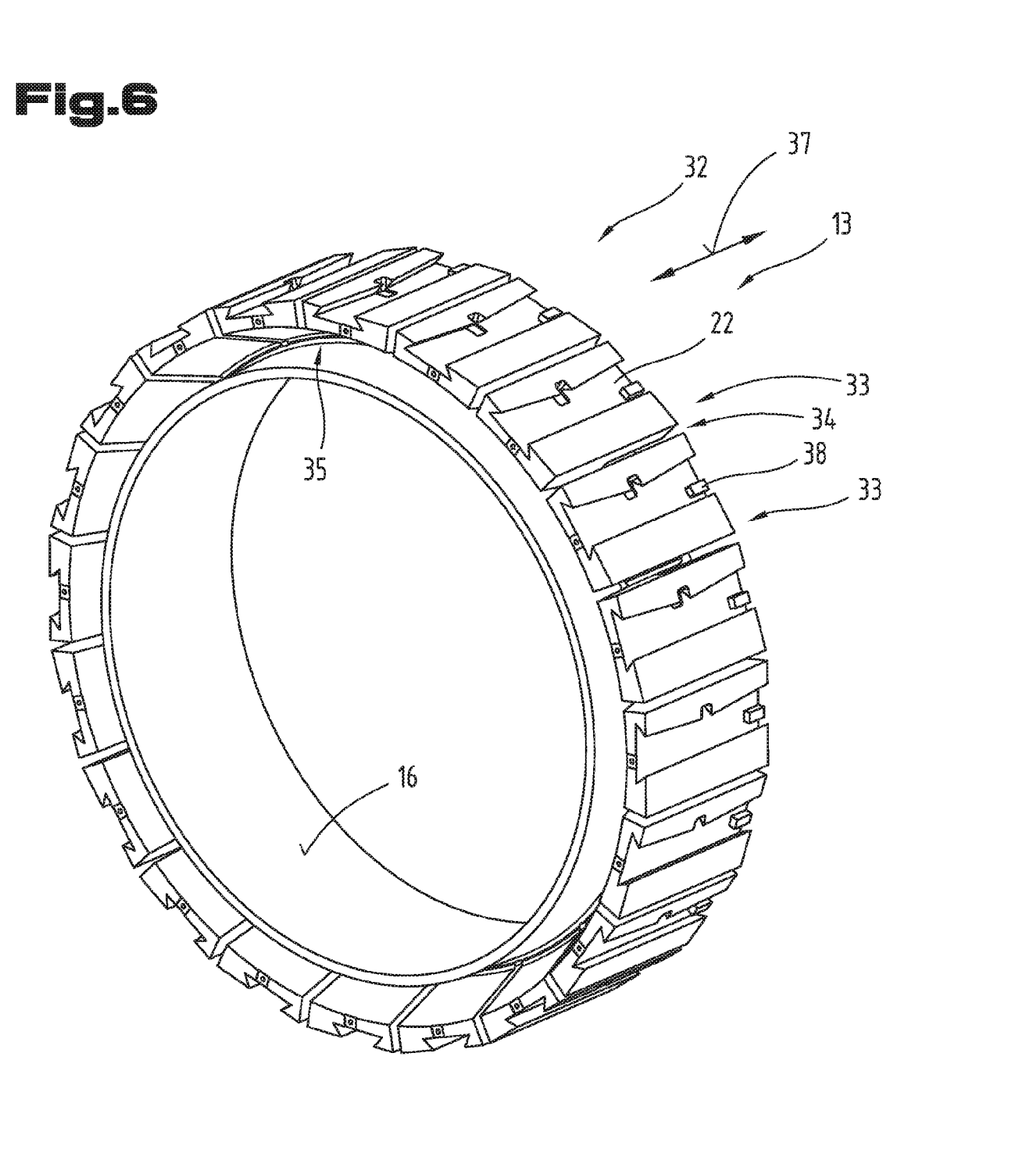
FIG. 6 a perspective view of an exemplary embodiment of an inner ring element.

FIG. 6 shows a perspective view of the inner ring element 13. As can be seen from a combination of FIGS. 3 to 6, the individual receiving profiles 22 are arranged on an outside 32 of the inner ring element 13. As can be further seen in FIG. 6, it may be provided that individual tilting segments 33 are formed on the inner ring element 13, in which tilting segment 33 the receiving profiles 22 are arranged. In particular, it may be provided that one individual receiving profile 22 is arranged per tilting segment 33. The individual tilting segments 33 may be separated from one another by a gap 34 formed in the circumferential direction. Moreover, the individual tilting segments 33 are coupled to the inner jacket surface 16 of the inner ring element 13 by means of a connecting piece 35. The connecting piece 35 may, in this regard, be formed as a material taper, which has an elasticity. By these measures, the individual tilting segments 33 can be tilted with respect to a tilting angle 36, individually and independently of one another, relative to the inner jacket surface 16 of the inner ring element 13. In this regard, the individual tilting segments 33 are tilted about an axis of rotation oriented in an axial direction 37.

As can be seen particularly well in FIG. 6, it may be provided that an axial stop 38 is formed inside the receiving profile 22, which axial stop 38 serves to axially position the sliding bearing pad 20. Moreover, it may be provided that an axial stop recess 39 is formed in the fastening profile 21 of the sliding bearing pad 20, which axial stop recess 39 corresponds with the axial stop 38. By means of the axial stop recess 39 it can be achieved that in the assembled state, the first axial bearing surface 27 is formed to protrude relative to the inner ring element 13.

As can be seen in FIG. 3, it may be provided that an axial clamping element 40 is fastened to the inner ring element 13 by means of a fastening means 41 and acts on the second end face 29 of the sliding bearing pad 20, so that the sliding bearing pad 20 is clamped between the axial clamping element 40 and the axial stop 38.

As can be seen particularly well in FIG. 4, it may be provided that an axial clamping element recess 42 is formed on the sliding bearing pad 20, in particular on the fastening profile 21, which axial clamping element recess 42 cooperates with the axial clamping element 40.

As can further be seen in FIG. 3, it may be provided that the axial stop 38 is arranged on a first front side 44 of the inner ring element 13, and that the axial clamping element 40 is arranged on a second front side 45 of the inner ring element 13.

As can also be seen in FIG. 3, it may be provided that a first recess 46 is formed on the first front side 44 of the inner ring element 13, and a second recess 47 is formed on the second front side 45, wherein by provisioning the recesses 46, 47, the flexible connecting piece is formed.

As can further be seen in FIG. 3, it may be provided that the outer ring element 14 has a first end wall 49 on a first front side 48, wherein the first end wall 49 is formed so as to protrude beyond the counterface 24 of the outer ring element 14. A first end wall inner surface 50, which serves as a contact surface for the first axial bearing surface 27 of the sliding bearing pads 20, is formed on the first end wall 49. In this regard, the first end wall inner surface 50 may also be formed as a hard, wear-resistant surface, analogously to the counterface 24, and the first axial bearing surface 27 may also be formed as a soft surface made of a sliding bearing material, analogously to the radial bearing surface 23.

On a second front side 51 of the outer ring element 14, a second end wall 52 may be formed, which has a second end wall inner surface 53. The second end wall inner surface 50 may cooperate with the second end face 29 of the sliding bearing pad 20. The structure of the second end wall 52 may be formed analogously to the structure of the first end wall 49.

Furthermore, it may be provided that the first end wall inner surface 50 and the second end wall inner surface 53 of the outer ring element 14 are arranged at an axial distance 54 from one another. The first axial bearing surface 27 and the second axial bearing surface 30 of the sliding bearing pad 20 are arranged at an axial distance 55 from one another. The axial distance 54 of the end wall inner surfaces 50, 53 and the axial distance 55 of the axial bearing surfaces 27, 30 are preferably dimensioned such that a clearance fit is formed.

As can further be seen in FIG. 3, it may be provided that an opening 56 is formed in the second end wall 52 of the outer ring element 14, which opening 56 serves for the axial insertion and removal of individual sliding bearing pads 20 into and out of the inner ring element 13. Furthermore, it may be provided that a lid 57 is formed, which can be fastened to the outer ring element 14 by means of fastening means 58, in order to close the opening 56.

Figure 7:
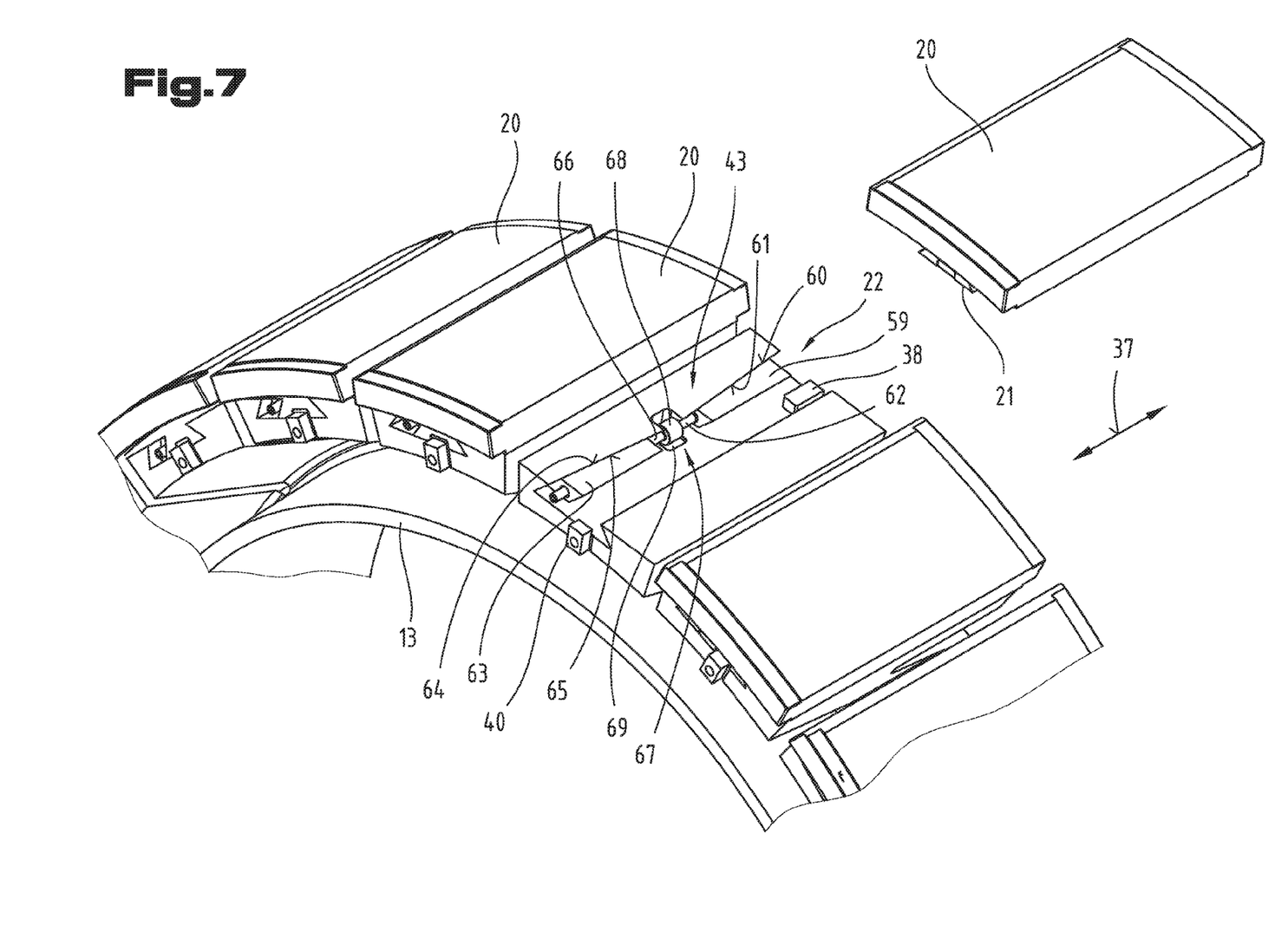
FIG. 7 a perspective view of the inner ring element with sliding bearing pads arranged thereon.

FIG. 7 shows a perspective view of the inner ring element 13 including the sliding bearing pads 20 arranged thereon. For better representation of the functioning of the connection between the individual sliding bearing pads 20 and the inner ring element 13, one of the sliding bearing pads 20 is pushed to the side.

As can be seen in FIG. 7, it may be provided that a clamping device 43 is formed, which serves to fix the sliding bearing pad 20 in the inner ring element 13. The clamping device 43 may act, in particular, between the fastening profile 21 of the sliding bearing pad 20 and the receiving profile 22 of the inner ring element 13 and/or be arranged completely or partially in the receiving profile 22. As can further be seen in FIG. 7, it may be provided that the clamping device 43 comprises at least a first clamping wedge 59, which has a wedge surface 60. In the receiving profile 22, a counter wedge surface 61 is formed, which tapers in the axial direction 37 and which cooperates with the wedge surface 60. Furthermore, a first positioning means 62 is provided, by means of which the first clamping wedge 59 can be displaced in the axial direction 37. By displacing the first clamping wedge 59 in the axial direction 37, the dovetail receptacle for the fastening profile 21 of the sliding bearing pad 20 can be increased or decreased in size, whereby a clamping of the fastening profile 21 can be achieved.

Analogously to this, it may be provided that the clamping device 43 comprises a second clamping wedge 63, which also has a wedge surface 64. The wedge surface 64 may cooperate with a second counter wedge surface 65 formed in the receiving profile 22 and tapering in the axial direction 37. The first counter wedge surface 61 and the second counter wedge surface 65 are formed to taper in opposite directions. The second clamping wedge 63 can be displaced in the axial direction 37 by means of a second positioning means 66. In particular, it may be provided that the first positioning means 62 and the second positioning means 66 are formed on a common positioning rod 67. Furthermore, it may be provided that the positioning rod 67 has an axial guide 68, which is received in the positioning rod receptacle 69, wherein the positioning rod receptacle 69 is formed in the receiving profile 22. The axial guide 68 may be designed, for example, as a drum.

In particular, it may be provided that the first positioning means 62 has a left-handed thread and the second positioning means 66 has a right-handed thread, so that, when rotating the positioning rod 67 in a first direction, the two clamping wedges 59, 63 are removed from one another, and when rotating the positioning rod 67 in a second direction of rotation, the two clamping wedges 59, 63 are moved towards one another. Thus, the clamping can be opened and/or closed by rotating the positioning rod 67. Of course, the left-handed thread and the right-handed thread may also be switched.

An assembly of the sliding bearing 9 is described with the aid of FIGS. 3 and 7. In a first method step, the outer ring element 14 is fixed on its installation site, for example in the nacelle housing 4. Subsequently, a shaft, for example the rotor shaft 17, along with the inner ring element 13 arranged thereon is inserted in the axial direction into the outer ring element 14, wherein the individual sliding bearing pads 20 are not yet arranged on the inner ring element 13 during this procedure. Subsequently, the inner ring element 13 is coaxially oriented relative to the outer ring element 14 in the axial position and also in the radial position.

Subsequently, the clamping device 43 can be positioned in the receiving profile 22. When positioning the clamping device 43 in the receiving profile 22, the first clamping wedge 59 and the second clamping wedge 63 are arranged in the receiving profile 22 spaced apart from one another at such a distance that the fastening profile 21 of the sliding bearing pad 20 can be smoothly inserted in the axial direction in the receiving profile 22. Alternatively, the individual clamping devices 43 may be positioned in the receiving profile 22 already before the inner ring element 13 is joined with the outer ring element 14.

Subsequently, a sliding bearing pad 20 can be pushed through the opening 56 in the axial direction 37 and onto the inner ring element 13. In this process, the fastening profile 21 of the sliding bearing pad 20 is inserted into the receiving profile 22.

The sliding bearing pad 20 is inserted into the receiving profile 22 until the axial stop recess 39 abuts on the axial stop 38. Thereby, the axial position of the sliding bearing pad 20 is defined. Subsequently the axial clamping element 40 can be applied to the inner ring element 13 in order to secure the sliding bearing pad 20 in its axial position. Subsequently, the positioning rod 37 can be rotated in the screwing-in direction, so that the two clamping wedges 59, 63 are pulled toward one another. By this movement of the two clamping wedges 59, 63 or by the wedge surfaces 60, 64, the fastening profile 21 of the sliding bearing pads 20 is clamped in the receiving profile 22 by means of the clamping wedges 59, 63. Hence, the sliding bearing pad 20 is fixed on the inner ring element 13. Optionally, the fastening element 41 of the axial clamping element 40 can then be retightened.

Subsequently, the inner ring element 13 is rotated about an angle along with the shaft, so that the next sliding bearing pad 20 can be inserted into the inner ring element 13 through the opening 56 in the manner described above. The processes described above are repeated until a sliding bearing pad 20 is received in all receiving profiles 22 of the inner ring element 13.

Subsequently, the lid 57 can be fastened in the opening 58 by means of the fastening means 56, in order to hence close the outer ring element 14.

After completing the installation, a mount and/or bearing of the shaft necessary for installation can be removed, so that the shaft is supported in the bearing mount 18 by means of the sliding bearing 9 and is therefore operational.

For replacing the individual sliding bearing pads 20, it is not necessary that the load of the shaft is absorbed by an external bearing, but it may be provided that only one individual sliding bearing pad 20 at a time is replaced by a new sliding bearing pad 20, wherein this procedure is repeated until all sliding bearing pads 20 are replaced. In this process, the lid 57 may be removed from the outer ring element 14. Subsequently, the clamping device 43 can be released, and after removing the axial clamping element 40, the released sliding bearing pad 20 can be pulled out of the inner ring element 13 in the axial direction 37. Subsequently, a new sliding bearing pad 20 may be placed in the position of the old sliding bearing pad 20 according to the description above. Subsequently, the newly inserted sliding bearing pad 20 can be fixed, and subsequently, the inner ring element 13 can be rotated so that the next sliding bearing pad can be replaced according to the steps described above. This procedure may be repeated until all sliding bearing pads 20 are replaced.

Figure 8:
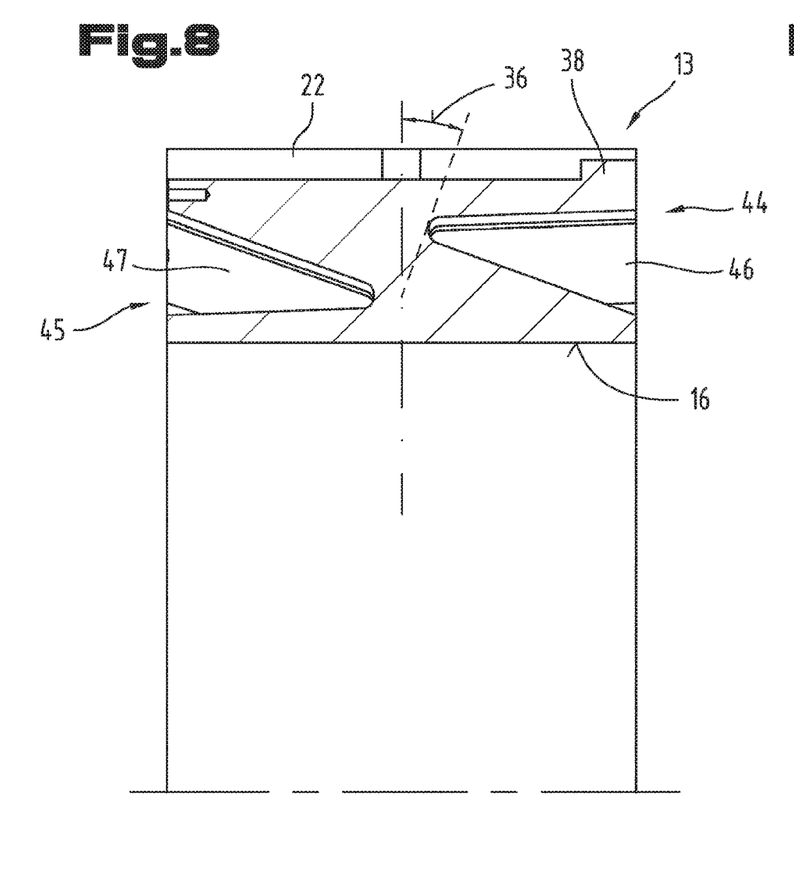
FIG. 8 a cross-sectional view of the inner ring element.
Figure 9:
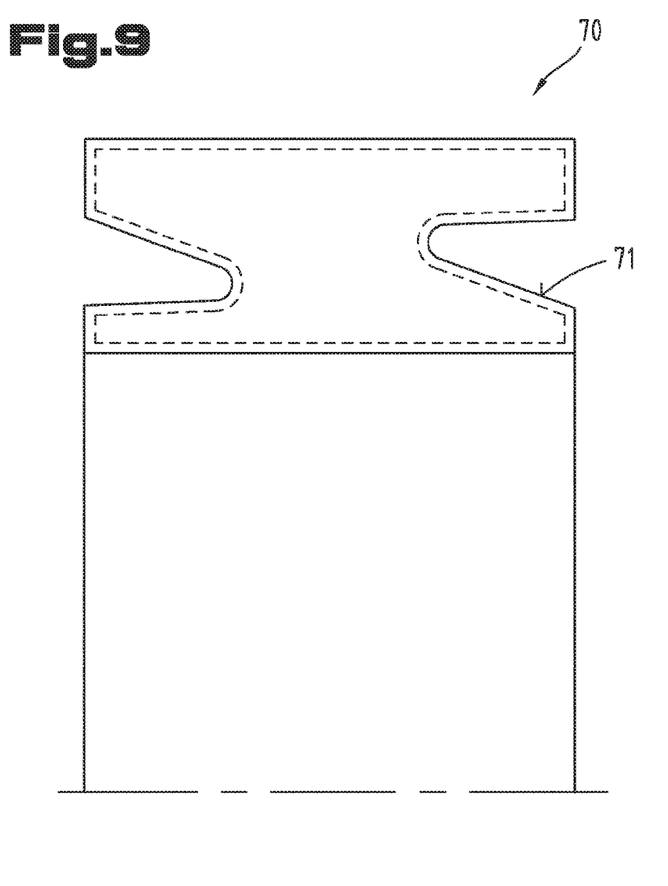
FIG. 9 a cross-sectional view of the inner ring blank.

With the aid of FIGS. 8 and 9, the production process for producing the inner ring element 13 is described. FIG. 8 shows a cross-section of the finished inner ring element 13, and FIG. 9 shows, in a same view, the cross-section of an inner ring blank 70 from which the inner ring element 13 is produced.

The inner ring blank 70 is forged to create the rough shape of a blank contour 71. This may take place with the aid of a ring rolling mill, for instance. Subsequently, the inner ring blank 70 can be normalized, so that it loses the internal stresses caused by the rolling operation.

Subsequently, the inner ring blank can be normalized. The selection of the temperatures and/or the duration of the normalizing operation is within the capabilities of the person skilled in the art.

Subsequently, the end contour of the inner ring element 13 can be produced by machining the inner ring blank 70. In particular, the receiving profile 22, the gap 34 as well as the first recess 46 and the second recess 47 can be produced by means of machining. Moreover, the inner jacket surface 16 of the inner ring element 13 may be made to the size of a fit.

Alternatively, it is also conceivable that the machining of the inner ring blank 70 is carried out in two steps, wherein certain regions are not yet produced to have the final end contour of the inner ring element 13 but in certain areas, a machining allowance is kept in a first machining step. Subsequently, the partially processed inner ring blank 70 can be annealed, and afterwards be processed to its end contour by means of machining. In this process, it is conceivable, for instance, that for machining the inner ring element 13, only a grinding operation is carried out after annealing.

Figure 10:
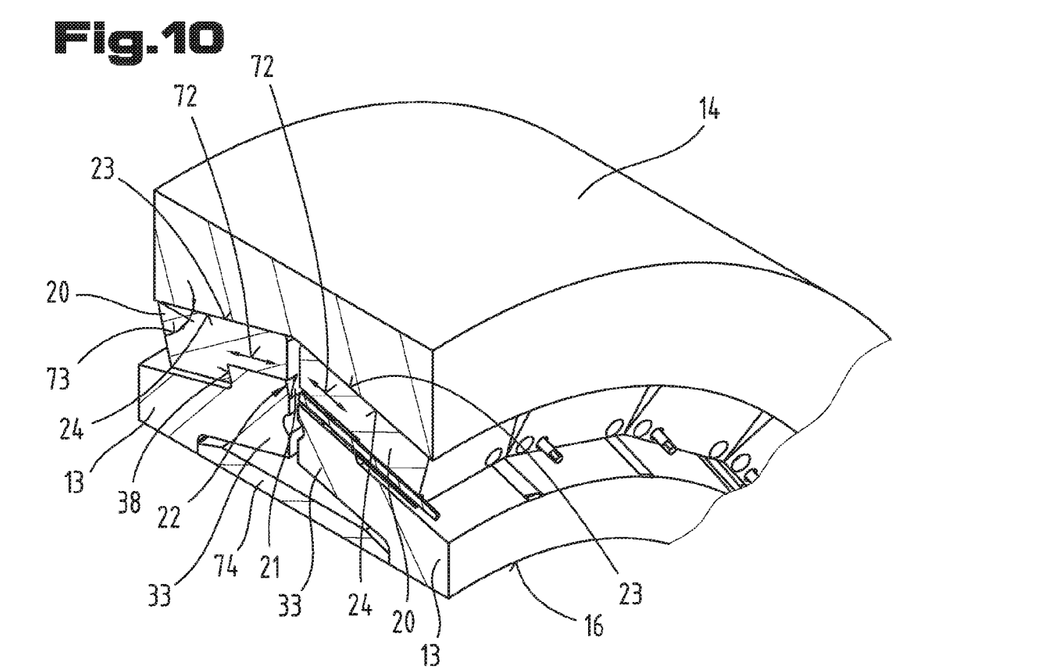
FIG. 10 a perspective sectional view of a second exemplary embodiment of the sliding bearing.

FIG. 10 shows a further and possibly independent embodiment of the sliding bearing 9, wherein again, equal reference numbers and/or component designations are used for equal parts as in FIGS. 2 through 9 above. In order to avoid unnecessary repetitions, it is pointed to/reference is made to the detailed description in FIGS. 2 through 9 preceding it.

As can be seen in FIG. 10, it may be provided that in a mirrored or mirror-inverted embodiment, two inner ring elements 13 are formed, each of which serving to receive sliding bearing pads 20. Hence, two sliding bearing pads 20 are arranged opposite of each other in the axial direction 37 and spaced apart from one another. The sliding bearing pads 20 arranged opposite of each other, in particular their radial bearing surfaces 23, may be arranged at an angle 73 relative to the inner jacket surface 16 of the inner ring element 13. The radial bearing surfaces 23 can thus be designed to be V-shaped. Correspondingly therewith, the counterface 24 may also be designed to be V-shaped. In such an embodiment variant, the radial bearing surfaces 23 and/or the counterface 24 may absorb radial bearing forces and axial bearing forces simultaneously. Thus, it is not necessary in such an embodiment variant that an additional axial bearing is formed.

The fastening system for the sliding bearing pads 20 on the inner ring element 13 may be designed analogously to the exemplary embodiment of FIGS. 2 to 9 described above. In this regard, it may be provided that the fastening profile 21 is provided on the sliding bearing pad 20, which fastening profile 21 corresponds with the receiving profile 22 of the inner ring element 13.

The fastening profile 21 can also be formed as a spring element, and the receiving profile 22 may be formed as a groove, wherein a dovetail connection, in particular, may be provided.

Moreover, an axial stop 38 may be arranged on the inner ring element 13, which axial stop 38 serves for the axial positioning of the sliding bearing pads 20. Analogously to the above exemplary embodiment, the sliding bearing pads 20 may be secured in the axial direction by means of the axial clamping element 40 and/or be fastened and/or secured on the inner ring element 13 by the clamping device 43.

The two inner ring elements 13 may each have tilting segments 33, on which the receiving profile 22 is formed. The tilting segments 33 may each be designed in the form of a protruding arm.

When assembling and/or replacing the sliding bearing pads 20, they are not inserted in the axial direction 37 between the inner ring element 13 and the outer ring element 14 as described in the above exemplary embodiment, but they are inserted in the diagonal direction 72 between the inner ring element 13 and the outer ring element 14. In this regard, the insertion direction and/or diagonal direction 72 extends in parallel with the counterface 24 observed in the cross-section.

Furthermore, a spacer 74 is formed between the two inner ring elements 13, by means of which spacer 74 the bearing gap is defined.

Figure 11:
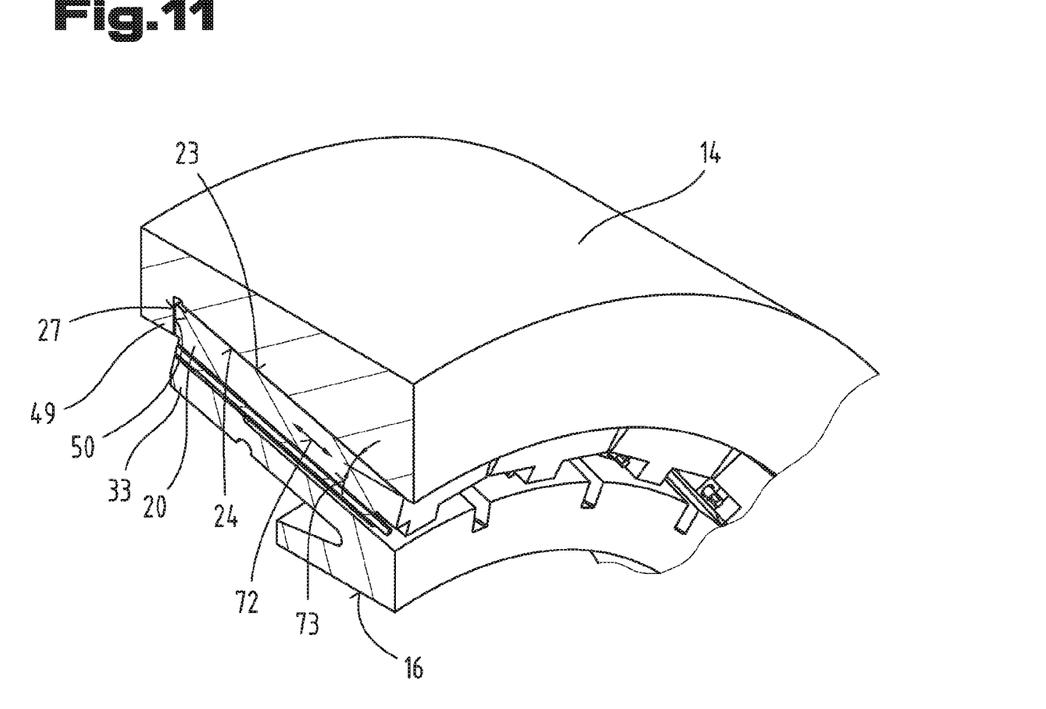
FIG. 11 a perspective sectional view of a third exemplary embodiment of the sliding bearing.

FIG. 11 shows a further and possibly independent embodiment of the sliding bearing 9, wherein again, equal reference numbers and/or component designations are used for equal parts as in FIGS. 2 through 10 above. In order to avoid unnecessary repetitions, it is pointed to/reference is made to the detailed description in FIGS. 2 through 10 preceding it.

The exemplary embodiment of the sliding bearing 9 from FIG. 11 is similar to the exemplary embodiment of the sliding bearing 9 from FIG. 10 in terms of its structure. In the exemplary embodiment according to FIG. 11, there are also multiple sliding bearing pads 20 arranged so as to be distributed across the circumference, wherein, however, only one row of sliding bearing pads 20 is formed.

The sliding bearing pads 20 each have the first radial bearing surface 23 and the first axial bearing surface 27. In the built-in state, the radial bearing surface 23 is arranged here at an angle 73 relative to the inner jacket surface 16 of the inner ring element 13. The first axial bearing surface 27 may be arranged at a right angle relative to the inner jacket surface 16 of the inner ring element 13.

In such an exemplary embodiment, the radial bearing surface 23 and the first axial bearing surface 27 are arranged in a V-shape. The radial bearing surface 23 can thus serve to absorb radial bearing forces and axial bearing forces in a first axial direction. The first axial bearing surface 27 serves to absorb axial forces in the second axial direction. Such axial forces in the second axial direction are introduced into the first axial bearing surface 27 by the slope of the radial bearing surface 23 also when applying pure radial bearing forces to the radial bearing surface 23.

The connection between the individual sliding bearing pads 20 and the inner ring element 13 may be formed analogously to the exemplary embodiments described above.

In the exemplary embodiments of the sliding bearing 9 as it is shown in FIG. 10 or 11, the angle 73 may be between 0° and 45°, in particular between 5° and 30°, preferably between 15° and 20°.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

List of reference numbers

1 Wind turbine
2 Nacelle
3 Tower
4 Nacelle housing
5 Rotor
6 Rotor hub
7 Rotor blade
8 Rotor bearing
9 Sliding bearing
10 Radial force
11 Axial force
12 Tilting torque
13 Inner ring element
14 Outer ring element
15 Sliding bearing element
16 Inner jacket surface of the inner ring element
17 Rotor shaft
18 Bearing mount
19 Rotor axis
20 Sliding bearing pad
21 Fastening profile
22 Receiving profile
23 Radial bearing surface
24 Counterface
25 Inside
26 First end face of the sliding bearing pad
27 First axial bearing surface
28 First angle
29 Second end face of the sliding bearing pad
30 Second axial bearing surface
31 Second angle
32 Outside
33 Tilting segment -continued List of reference numbers

| | |
|---|---|
| 34 | Gap |
| 35 | Connecting piece |
| 36 | Tilting angle |
| 37 | Axial direction |
| 38 | Axial stop |
| 39 | Axial stop recess |
| 40 | Axial clamping element |
| 41 | Mounting means |
| 42 | Axial clamping element recess |
| 43 | Clamping device |
| 44 | First front side |
| 45 | Second front side |
| 46 | First recess |
| 47 | Second recess |
| 48 | First front side |
| 49 | First end wall |
| 50 | First end wall inner surface |
| 51 | Second front side |
| 52 | Second end wall |
| 53 | Second end wall inner surface |
| 54 | Axial distance of the end wall inner surfaces |
| 55 | Axial distance of the axial bearing surfaces |
| 56 | Opening |
| 57 | Lid |
| 58 | Fastening means |
| 59 | First clamping wedge |
| 60 | Wedge surface of the first clamping wedge |
| 61 | First counter wedge surface |
| 62 | First positioning means |
| 63 | Second clamping wedge |
| 64 | Wedge surface of the second clamping wedge |
| 65 | Second counter wedge surface |
| 66 | Second positioning means |
| 67 | Positioning rod |
| 68 | Axial guide |
| 69 | Positioning rod receptacle |
| 70 | Inner ring blank |
| 71 | Blank contour |
| 72 | Diagonal direction |
| 73 | Angle |
| 74 | Spacer |

The invention claimed is:

1. A sliding bearing comprising:
an inner ring element;
an outer ring element;
at least one sliding bearing element, which is arranged between the inner ring element and the outer ring element,
wherein the sliding bearing element has multiple sliding bearing pads,
wherein the individual sliding bearing pads each have a radial bearing surface and a fastening profile located opposite the radial bearing surface,
wherein the inner ring element has at least a receiving profile on its radial outside to form a positive locking connection between the sliding bearing pads and the inner ring element,
wherein the fastening profile of the sliding bearing pad and the receiving profile of the inner ring element are formed such that the sliding bearing pad can be inserted into the inner ring element in an axial direction or in a diagonal direction,
wherein an axial stop for the sliding bearing pad is formed on the inner ring element in the region of the receiving profile,
wherein a releasable axial clamping element for the sliding bearing pad is formed on the inner ring element in the region of the receiving profile, and
wherein a first end face of the sliding bearing pad can be placed on the axial stop in the axial direction, and the axial clamping element can act upon a second end face of the sliding bearing pad, and
wherein each of the sliding bearing pads is assigned at least one of the axial clamping elements.

2. The sliding bearing according to claim 1, wherein the fastening profile and the receiving profile are formed as a dovetail connection.

3. The sliding bearing according to claim 1, wherein a clamping device for clamping the sliding bearing pad is arranged between the fastening profile of the sliding bearing pad and the receiving profile of the inner ring element.

4. The sliding bearing according to claim 3,
wherein the clamping device comprises at least a first clamping wedge, which has a wedge surface, which cooperates with a first counter wedge surface formed in the receiving profile and tapering in the axial direction, and
wherein the first clamping wedge can be displaced in the axial direction by means of a first positioning means.

5. The sliding bearing according to claim 4,
wherein the clamping device comprises a second clamping wedge, which has a wedge surface, which cooperates with a second counter wedge surface formed in the receiving profile and tapering in the axial direction,
wherein the first counter wedge surface and the second counter wedge surface are formed to taper in opposite directions,
wherein the second clamping wedge can be displaced in the axial direction by means of a second positioning means.

6. The sliding bearing according to claim 5, wherein the first positioning means and the second positioning means are formed on a common positioning rod, wherein the first positioning means has a right-handed thread and the second positioning means has a left-handed thread.

7. The sliding bearing according to claim 1, wherein at least a first axial bearing surface is formed on the sliding bearing pad, which first axial bearing surface is arranged at a first angle of 90° relative to the radial bearing surface when viewed in a longitudinal section.

8. The sliding bearing according to claim 1, wherein the inner ring element has multiple tilting segments, which are arranged so as to be distributed across the circumference, wherein the individual tilting segments are arranged so as to be spaced apart from one another in the circumferential direction and can be tilted independently of one another, wherein at least one of the receiving profiles is formed for each tilting segment.

9. The sliding bearing according to claim 8, wherein the individual tilting segments have a first recess (46) at least on a first front side observed in the axial direction.

10. A nacelle for a wind turbine, the nacelle comprising:
a nacelle housing;
a rotor hub;
a rotor bearing for bearing the rotor hub on the nacelle housing, wherein the rotor bearing comprises the sliding bearing according to claim 1.

11. A wind turbine having a nacelle, the nacelle comprising:
a nacelle housing;
a rotor hub with rotor blades arranged thereon;
a rotor bearing for bearing the rotor hub on the nacelle housing, wherein the rotor bearing comprises the sliding bearing according to claim 1.

12. A method for replacing sliding bearing pads in the sliding bearing according to claim 1, comprising the method steps:

removing one of the sliding bearing pads by pulling the fastening profile of the one sliding bearing pad axially out of the receiving profile of the inner ring element;

inserting a new sliding bearing pad by pushing a fastening profile of the new sliding bearing pad axially into the receiving profile of the inner ring element.

13. A method for producing an inner the sliding bearing according to claim 1, comprising the method steps:

pre-forging an inner ring blank for a rough shaping of a blank contour;

normalizing the inner ring blank;

producing the receiving profile by processing the inner ring blank by means of machining.

14. A sliding bearing comprising:

an inner ring element;

an outer ring element;

at least one sliding bearing element, which is arranged between the inner ring element and the outer ring element, wherein the sliding bearing element has multiple sliding bearing pads, wherein the individual sliding bearing pads each have a radial bearing surface and a fastening profile located opposite the radial bearing surface, wherein the inner ring element has at least a receiving profile on its radial outside to form a positive locking connection between the sliding bearing pads and the inner ring element, and wherein a clamping device for clamping the sliding bearing pad is arranged between the fastening profile of the sliding bearing pad and the receiving profile of the inner ring element.

15. A sliding bearing comprising:

an inner ring element;

an outer ring element;

at least one sliding bearing element, which is arranged between the inner ring element and the outer ring element, wherein the sliding bearing element has multiple sliding bearing pads, wherein the individual sliding bearing pads each have a radial bearing surface and a fastening profile located opposite the radial bearing surface, wherein the inner ring element has at least a receiving profile on its radial outside to form a positive locking connection between the sliding bearing pads and the inner ring element, wherein the outer ring element is designed to be sleeve-shaped, wherein a first end wall protruding radially inwards is formed on a first front side, and wherein a first axial bearing surface of the sliding bearing pad abuts on the first end wall.

\* \* \* \* \*

UNITED STATES PATENT AND TRADEMARK OFFICE
CERTIFICATE OF CORRECTION

PATENT NO. : 11,486,446 B2
APPLICATION NO. : 17/434889
DATED : November 1, 2022
INVENTOR(S) : Hoelzl et al.

It is certified that error appears in the above-identified patent and that said Letters Patent is hereby corrected as shown below:

In the Claims

In Claim 13, Line 1 (Line 7 of Column 15) please delete "an inner"

Signed and Sealed this
Sixth Day of December, 2022

Katherine Kelly Vidal
*Director of the United States Patent and Trademark Office*